(12) United States Patent
Kodama

(10) Patent No.: US 9,290,595 B2
(45) Date of Patent: Mar. 22, 2016

(54) PROCESS FOR THE PRODUCTION OF A FLOUROOLEFIN/VINYL ALCOHOL COPOLYMER

(71) Applicant: ASAHI GLASS COMPANY, LIMITED, Tokyo (JP)

(72) Inventor: Shunichi Kodama, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 138 days.

(21) Appl. No.: 14/246,791

(22) Filed: Apr. 7, 2014

(65) Prior Publication Data
US 2014/0221570 A1 Aug. 7, 2014

Related U.S. Application Data

(60) Division of application No. 13/564,128, filed on Aug. 1, 2012, now abandoned, which is a continuation of application No. PCT/JP2011/058736, filed on Apr. 6, 2011.

(30) Foreign Application Priority Data

Apr. 8, 2010 (JP) .................. 2010-089504

(51) Int. Cl.
| | | |
|---|---|---|
| C08F 14/18 | (2006.01) | |
| C08F 114/18 | (2006.01) | |
| C08F 214/18 | (2006.01) | |
| C08F 216/06 | (2006.01) | |
| C08F 214/24 | (2006.01) | |
| C08F 214/26 | (2006.01) | |
| C08F 216/14 | (2006.01) | |
| C08F 216/18 | (2006.01) | |

(52) U.S. Cl.
CPC ........... *C08F 216/06* (2013.01); *C08F 214/267* (2013.01); *C08F 214/247* (2013.01); *C08F 214/262* (2013.01); *C08F 216/1416* (2013.01); *C08F 216/18* (2013.01); *C08F 2800/10* (2013.01); *C08F 2810/50* (2013.01)

(58) Field of Classification Search
CPC ...... C08F 214/267; C08F 216/06; C08F 8/12; C08F 216/18; C08F 214/26
See application file for complete search history.

(56) References Cited

U.S. PATENT DOCUMENTS

| | | | |
|---|---|---|---|
| 5,032,656 A | 7/1991 | Mares et al. | |
| 5,070,162 A | 12/1991 | Oxenrider et al. | |
| 5,130,024 A | 7/1992 | Fujimoto et al. | |
| 5,135,998 A | 8/1992 | Mares et al. | |
| 5,137,999 A | 8/1992 | Oxenrider et al. | |
| 5,151,477 A | 9/1992 | Oxenrider et al. | |
| 5,173,556 A | 12/1992 | Mares et al. | |
| 5,188,890 A | 2/1993 | Ohashi et al. | |
| 5,304,617 A | 4/1994 | Kodama et al. | |
| 5,445,739 A | 8/1995 | Fujimoto et al. | |
| 7,939,094 B2 | 5/2011 | Schwarz et al. | |

FOREIGN PATENT DOCUMENTS

| | | |
|---|---|---|
| EP | 0 397 698 A1 | 11/1990 |
| GB | 1006591 A | 10/1965 |
| JP | 02-502832 | 9/1990 |
| JP | 04-139237 | 5/1992 |
| JP | 05-017535 | 1/1993 |
| JP | 05-261256 | 10/1993 |
| JP | 06-001876 | 1/1994 |
| JP | 08-034817 | 2/1996 |

OTHER PUBLICATIONS

Frederick T. Wall, "The Structure of Copolymers II", J. Am. Chem. Soc., 1 9 4 4, 66 (12), pp. 2050-2057.
Robert Z. Greenley, Q and e Values for Free Radical Copolymerizations of Vinyl Monomers and Telogens, Polymer Handbook, 1 9 9 9, Fourth Edition, vol. 1, 13 pages.
International Search Report issued Jun. 28, 2011 in PCT/JP2011/058736 filed Apr. 6, 2011.
Mario Modena, et al.; "Vinyl Acetate and Vinyl Alcohol Copolymers With Tetrafluoroethylene"; European Polymer Journal, 1967, vol. 3, pp. 5-12.
Extended European Search Report issued Nov. 5, 2013 in Patent Application No. 11765956.5.
Michael M. Coleman, et al., Equilibrium Constants and the Prediction of Miscibility Windows for Polymer Blends Containing Poly (tetrafluoroethylene-alt-vinyl alcohol) Journal of Polymer Science: Part A: Polymer Chemistry, vol. 31, No. 8, XP-002715176, 1993, pp. 2039-2056.
Ni Yu, "Technology Progress of FEVE Fluoro-Carbon Resin", FEVE, Jan. 2006, pp. 13-18 (with English-language Abstract).

*Primary Examiner* — David W Wu
*Assistant Examiner* — Marie Reddick
(74) *Attorney, Agent, or Firm* — Oblon, McClelland, Maier & Neustadt, L.L.P.

(57) ABSTRACT

To provide a process for producing a fluoroolefin/vinyl alcohol copolymer with sufficiently high productivity and excellent heat resistance, whereby a quality loss by coloration is prevented, and a fluoroolefin/vinyl alcohol copolymer obtainable by such a process. A process for producing a fluoroolefin/vinyl alcohol copolymer, which comprises a polymerization step of copolymerizing a specific fluoroolefin and a vinyl ether having a hydrogen atom of a hydroxy group of a vinyl alcohol substituted with a protective group which can be deprotected, and a deprotection step of substituting the protective group in polymerized units based on the vinyl ether in the copolymer obtained in the polymerization step, with a hydrogen atom to form a hydroxyl group, and the fluoroolefin/vinyl alcohol copolymer obtainable by such a process.

5 Claims, 2 Drawing Sheets

PROCESS FOR THE PRODUCTION OF A FLOUROOLEFIN/VINYL ALCOHOL COPOLYMER

This application is a divisional application of U.S. Ser. No. 13/564,128 filed on Aug. 1, 2012, now abandoned, which is a continuation application of PCT/JP11/58736 filed on Apr. 6, 2011.

TECHNICAL FIELD

The present invention relates to a fluoroolefin/vinyl alcohol copolymer and a process for its production.

BACKGROUND ART

A fluoroolefin/vinyl alcohol copolymer, i.e. a copolymer of a fluoroolefin and vinyl alcohol, is used as a raw material for coating resins, a material for gas/liquid separation membranes, a gas barrier material, a sealing material for solar cells, a material for various surface protective sheets, a hydrophilic porous material, etc. (Patent Documents 1 and 2).

As a method for producing a fluoroolefin/vinyl alcohol copolymer, a method has already been known wherein a fluoroolefin and vinyl acetate are copolymerized, followed by hydrolysis under an acidic or basic condition (Patent Documents 1 and 2, and Non-Patent Document 3). In such a method, a fluoroolefin and vinyl acetate are used as raw materials, and they are copolymerized to obtain a fluoroolefin/vinyl acetate copolymer, and in such a copolymer, an ester moiety in polymerized units based on vinyl acetate is hydrolyzed to form a hydroxy group thereby to convert the polymerized units to ones based on vinyl alcohol. However, in the method of hydrolyzing the fluoroolefin/vinyl acetate copolymer under a basic condition, although the reaction rate is high, the obtainable copolymer is likely to be colored yellow, whereby the product quality tends to be low. Whereas, in the method of hydrolyzing the fluoroolefin/vinyl acetate copolymer under an acidic condition, the reaction rate is low, and the productivity is low. Further, the obtained fluoroolefin/vinyl alcohol copolymer usually has a low thermal decomposition starting temperature and thus has a problem in thermal stability.

PRIOR ART DOCUMENTS

Patent Documents

Patent Document 1: JP-A-5-261256
Patent Document 2: JP-A-6-1876

Non-Patent Document

Non-Patent Document 1: M. Ragazzini et. al., Eur. Polym. J., 3, 5 (1967)

DISCLOSURE OF INVENTION

Technical Problem

It is an object of the present invention to provide a process for producing a fluoroolefin/vinyl alcohol copolymer which has sufficiently high productivity and heat resistance, whereby a quality loss by coloration is prevented, and a fluoroolefin/vinyl alcohol copolymer obtainable by such a process.

Solution to Problem

In order to solve the above problem, the present invention provides a process for producing a fluoroolefin/vinyl alcohol copolymer, and a fluoroolefin/vinyl alcohol copolymer, having the following constructions.

[1] A process for producing a fluoroolefin/vinyl alcohol copolymer, which comprises a polymerization step of copolymerizing a fluoroolefin represented by the following formula (1) and a vinyl ether represented by the following formula (2), and a deprotection step of substituting $R^1$ in polymerized units based on the vinyl ether in the copolymer obtained in the polymerization step, with a hydrogen atom to form a hydroxy group:

$$CF_2\!=\!CFX \qquad (1)$$

$$CH_2\!=\!CHOR^1 \qquad (2)$$

wherein X is a fluorine atom, a chlorine atom, a trifluoromethyl group or $-OC_aF_{2a+1}$ (wherein a is an integer of from 1 to 3), and $R^1$ is a protective group to be substituted with a hydrogen atom by a deprotection reaction.

[2] The process for producing a fluoroolefin/vinyl alcohol copolymer according to the above [1], wherein $R^1$ in the formula (2) is $-CR^2R^3R^4$ (wherein each of $R^2$, $R^3$ and $R^4$ which are independent of one another, is a $C_{1-3}$ alkyl group), a $C_{1-6}$ alkoxymethyl group, a tetrahydrofuryl group, a tetrahydropyranyl group or a trialkylsilyl group ($-Si(R^5)_3$ wherein $R^5$ is a $C_{1-6}$ alkyl group or an aryl group).

[3] The process for producing a fluoroolefin/vinyl alcohol copolymer according to the above [1], wherein the compound represented by the formula (2) is t-butyl vinyl ether.

[4] The process for producing a fluoroolefin/vinyl alcohol copolymer according to any one of the above [1] to [3], wherein $R^1$ is substituted with a hydrogen atom by an acid.

[5] The process for producing a fluoroolefin/vinyl alcohol copolymer according to any one of the above [1] to [4], wherein in the polymerization step, the molar ratio of the fluoroolefin represented by the formula (1) to the vinyl ether represented by the formula (2) i.e. (fluoroolefin)/(vinyl ether) is from 45/55 to 55/45.

[6] The process for producing a fluoroolefin/vinyl alcohol copolymer according to any one of the above [1] to [5], wherein a vinyl ether represented by the following formula (3) is further copolymerized:

$$CH_2\!=\!CHOR^6 \qquad (3)$$

wherein $R^6$ is a group which is not susceptible to a deprotection reaction in the deprotection step.

[7] A fluoroolefin/vinyl alcohol copolymer having an alternating copolymerization rate of a fluoroolefin represented by the following formula (1) and vinyl alcohol being at least 95%:

$$CF_2\!=\!CFX \qquad (1)$$

wherein X is a fluorine atom, a chlorine atom, a trifluoromethyl group or $-OC_aF_{2a+1}$ (wherein a is an integer of from 1 to 3).

[8] The fluoroolefin/vinyl alcohol copolymer according to the above [7], which has a 10 mass % thermal decomposition starting temperature of at least 340° C.

Advantageous Effects of Invention

According to the process of the present invention, it is possible to produce a fluoroolefin/vinyl alcohol copolymer excellent in heat resistance with sufficiently high productivity, whereby a quality loss due to coloration is prevented.

Further, the fluoroolefin/vinyl alcohol copolymer of the present invention has a quality loss due to coloration prevented and has excellent heat resistance.

DESCRIPTION OF EMBODIMENTS

Figure 1A:
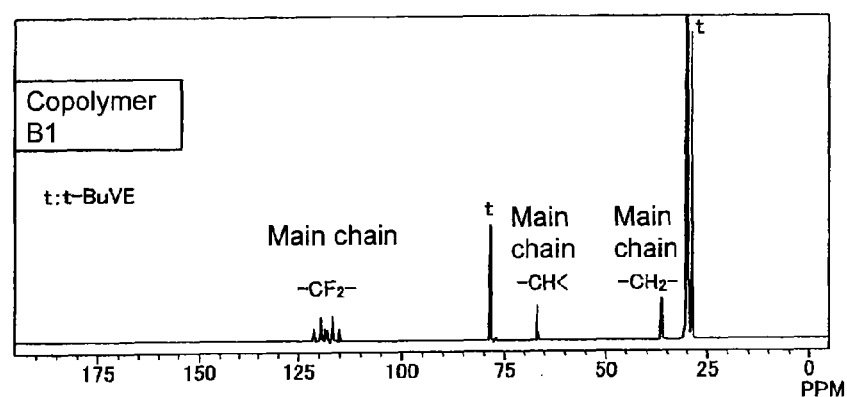
FIGS. 1(A) and (B) are $^{13}$C NMR charts of copolymer B1 (upper chart) and copolymer A1 (lower chart) in Example 1.

The process for producing a fluoroolefin/vinyl alcohol copolymer of the present invention (hereinafter referred to as "the copolymer (A)") comprises the following steps.

Polymerization step: a step of copolymerizing a fluoroolefin represented by the following formula (1) (hereinafter referred to as "the fluoroolefin (a)") and a vinyl ether represented by the following formula (2) (hereinafter referred to as "the vinyl ether (b)").

Deprotection step: a step of substituting $R^1$ in polymerized units based on the vinyl ether (b) in the copolymer obtained in the polymerization step, with a hydrogen atom to form a hydroxy group.

$$CF_2=CFX \tag{1}$$

$$CH_2=CHOR^1 \tag{2}$$

wherein X is a fluorine atom, a chlorine atom, a trifluoromethyl group or —$OC_aF_{2a+1}$ (wherein a is an integer of from 1 to 3), and $R^1$ is a protective group to be substituted with a hydrogen atom by a deprotection reaction.

That is, the process of the present invention is a process wherein in the polymerization step, a fluoroolefin/vinyl ether copolymer (hereinafter referred to as "the copolymer (B)") having polymerized units based on the fluoroolefin (a) and polymerized units based on the vinyl ether (b) is obtained, and then, $R^1$ in polymerized units based on the vinyl ether (b) in the copolymer (B) is substituted with a hydrogen atom by a deprotection reaction, to obtain the copolymer (A) having polymerized units based on the fluoroolefin and polymerized units based on vinyl alcohol.

Polymerization Step:

In the polymerization step, the fluoroolefin (a) represented by the above formula (1) and the vinyl ether (b) represented by the above formula (2) are copolymerized to obtain the copolymer (B) having polymerized units based on the fluoroolefin (a) and polymerized units based on the vinyl ether (b).

A specific example of the fluoroolefin (a) may, for example, be tetrafluoroethylene, chlorotrifluoroethylene, hexafluoropropylene or a perfluoro(alkyl vinyl ether). The perfluoro(alkyl vinyl ether) may, for example, be perfluoro(propyl vinyl ether). Among them, the fluoroolefin (a) is preferably tetrafluoroethylene or chlorotrifluoroethylene, particularly preferably tetrafluoroethylene, whereby the heat resistance will be excellent.

As the fluoroolefin (a), one type may be used alone, or two or more types may be used in combination.

The vinyl ether (b) is a vinyl ether having a hydrogen atom of a hydroxy group of vinyl alcohol substituted with a protective group which can be deprotected.

$R^1$ is a protective group which protects a hydroxy group in the form of an ether and which is substituted with a hydrogen atom by a deprotection reaction to form a hydroxy group, and a protective group which is commonly used in the organic chemical field may be used. From the viewpoint of availability, —$CR^2R^3R^4$ (wherein each of $R^2$, $R^3$ and $R^4$ which are independent of one another, is a $C_{1-3}$ alkyl group), a $C_{1-6}$ alkoxymethyl group, a tetrahydrofuryl group, a tetrahydropyranyl group or a trialkylsilyl group (—$Si(R^5)_3$ wherein $R^5$ is a $C_{1-6}$ alkyl group or an aryl group) is preferred, and —$CR^2R^3R^4$ is more preferred.

As the vinyl ether (b), t-butyl vinyl ether, 1,1-dimethylpropyl vinyl ether, methoxymethyl vinyl ether, tetrahydrofuryl vinyl ether, tetrahydropyranyl vinyl ether, vinyloxytrimethylsilane or vinyloxydimethylphenylsilane is preferred, and from the viewpoint of availability, t-butyl vinyl ether is particularly preferred.

As the vinyl ether (b), one type may be used alone, or two or more types may be used in combination.

The fluoroolefin (a) and the vinyl ether (b) have high alternating copolymerizability, and therefore, the alternating copolymerization rate of the obtainable copolymer (B) becomes at least 95% as calculated by probability calculation from the copolymerization reactivity ratio of the two monomers. The alternating copolymerization rate is the percentage of the number of combinations where polymerized units based on different monomers are adjacent to each other, based on the total number of combinations of adjacent two polymerized units. For example, in a case where the copolymer (B) is a copolymer represented by ababbababab (wherein a is a polymerized unit based on the fluoroolefin (a), and b is a polymerized unit based on the vinyl ether (b)), the total number of combinations of adjacent two polymerized units is 10, and the number of combinations where polymerized units based on different monomers are adjacent to each other, is 9, and therefore, the alternating copolymerization rate is 90%.

Since the alternating copolymerization rate of the copolymer (B) is at least 95%, the copolymer (A) obtainable from the copolymer (B) will have an alternating copolymerization rate of the fluoroolefin (a) and vinyl alcohol being at least 95%. In the copolymer (A) having such a high alternating copolymerization rate, polymerized units based on the fluoroolefin (a) and polymerized units based on vinyl alcohol are uniformly arranged, whereby the weather resistance and water resistance are improved. Further, for example, in a case where a curing agent is to be reacted to hydroxy groups in the copolymer (A) to form a cured product, the reactivity of hydroxy groups is more stabilized, since the hydroxy groups are uniformly distributed.

In the polymerization step to obtain the copolymer (B), in addition to the fluoroolefin (a) and the vinyl ether (b), a vinyl ether (c) represented by the following formula (3) may further be copolymerized.

$$CH_2=CHOR^6 \tag{3}$$

wherein $R^6$ is a group which is not susceptible to a deprotection reaction in the deprotection step.

The vinyl ether (c) is a vinyl ether wherein $R^6$ is not susceptible to a deprotection reaction in the deprotection step. "$R^6$ is not susceptible to a deprotection reaction in the deprotection step" means that $R^6$ is not susceptible to a deprotection reaction under the reaction conditions where $R^1$ in the vinyl ether (b) is substituted with a hydrogen atom by the deprotection reaction. That is, $R^6$ may be a group which is susceptible to a deprotection reaction under conditions other than the reaction conditions where $R^1$ is substituted with a hydrogen atom by the deprotection reaction.

When the vinyl ether (c) is used, $R^6$ in polymerized units based on the vinyl ether (c) in the copolymer (B) will not be deprotected in the deprotection step, and the polymerized units based on the vinyl ether (c) will be maintained as they are, in the obtainable copolymer (A).

$R^6$ in the vinyl ether (c) is preferably a $C_{1-6}$ primary or secondary alkyl group, or a group having at least one of hydrogen atoms in such an alkyl group substituted by a substituent. The substituent may, for example, be a functional group such as a hydroxy group, an amino group or a glycidyl group, a fluorine atom, or the like.

A specific example of the vinyl ether (c) may, for example, be an alkyl vinyl ether such as methyl vinyl ether, ethyl vinyl ether, n-butyl vinyl ether, isobutyl vinyl ether or cyclohexyl vinyl ether; a functional group-containing vinyl ether such as hydroxyethyl vinyl ether, hydroxybutyl vinyl ether, aminopropyl vinyl ether or glycidyl vinyl ether; or a fluorinated vinyl ether such as heptafluoropentyl vinyl ether.

In a case where the vinyl ether (c) is used, a vinyl ether of either one of the vinyl ether (b) and the vinyl ether (c), and the fluoroolefin (a) are alternately copolymerized to obtain the copolymer (B). The vinyl ether (b) and the vinyl ether (c) are substantially equal in the polymerization reactivity, and therefore, it is a question of probability that both sides of a polymerized unit based on the fluoroolefin (a) in the copolymer (B) become either a polymerized unit based on the vinyl ether (b) or a polymerized unit based on the vinyl ether (c).

In a case where the vinyl ether (c) is used, no deprotection reaction takes place at polymerized units based on the vinyl ether (c) in the copolymer (B). Therefore, by adjusting the ratio of the vinyl ether (b) to the vinyl ether (c), it is possible to adjust the proportion of polymerized units based on vinyl alcohol in the copolymer (A) after the deprotection step. Thus, by adjusting the amount of hydroxy groups in the copolymer (A), it is possible to adjust the hydrophilicity of the copolymer (A).

By subjecting the fluoroolefin (a), the vinyl ether (b) and, as the case requires, the vinyl ether (c) to radical polymerization, the copolymer (B) is obtainable. A monomer having a vinyl ether group (the vinyl ether (b) or the vinyl ether (c)) is likely to undergo isomerization, decomposition or cationic homopolymerization under an acidic condition. Therefore, with a view to carrying out the polymerization stably, it is preferred to carry out the radical polymerization under a basic condition, and it is more preferred to adjust the pH to be from 8 to 9. As a method of adjusting the pH to be under a basic condition in the polymerization, a method of adding e.g. potassium carbonate or ammonium carbonate to the polymerization medium, is preferred.

In a case where no vinyl ether (c) is used, the molar ratio (a/b) of the fluoroolefin (a) to the vinyl ether (b) to be used for the copolymerization, is preferably from 40/60 to 60/40, more preferably from 45/55 to 55/45, particularly preferably 50/50. When the molar ratio (a/b) is within the above range, it is possible to readily obtain an alternate copolymer having the fluoroolefin (a) and the vinyl ether (b) alternately copolymerized.

Further, in a case where the vinyl ether (c) is used, the molar ratio (a/(b+c)) of the fluoroolefin (a) to the total of the vinyl ether (b) and the vinyl ether (c) to be used for the copolymerization, is preferably from 40/60 to 60/40, more preferably from 45/55 to 55/45, particularly preferably 50/50. When the molar ratio (a/(b+c)) is within the above range, it is possible to readily obtain an alternate copolymer having the fluoroolefin (a) and the vinyl ether (b) or the vinyl ether (c) alternately copolymerized.

Further, in such a case, the molar ratio (b/c) of the vinyl ether (b) to the vinyl ether (c) is preferably 45/5 to 10/40, particularly preferably from 40/10 to 25/25.

As the radical polymerization initiation source, a radical polymerization initiator or an ionizing radiation may be mentioned. As the radical polymerization initiator, a water-soluble initiator or an oil-soluble initiator may suitably be used depending upon the polymerization type or the polymerization medium.

The water-soluble initiator may, for example, be a redox initiator composed of a combination of a persulfate such as ammonium persulfate, and a reducing agent such as hydrogen peroxide, sodium hydrogen sulfite or sodium thiosulfate; an inorganic initiator having a small amount of iron, a ferrous salt or silver nitrate incorporated to the above redox initiator; or an organic initiator, such as a dibasic acid peroxide such as disuccinic acid peroxide or diglutaric acid peroxide, or a dibasic acid salt such as azobisisobutylamidine.

The oil-soluble initiator may, for example be a peroxyester type peroxide such as t-butyl peroxyacetate or t-butyl peroxypivalate; a dialkylperoxydicarbonate such as diisopropylperoxydicarbonate; benzoyl peroxide; or azobisisobutylnitrile.

As the radical polymerization initiator, t-butyl peroxypivalate may, for example, be preferred, from the viewpoint of handling efficiency, etc.

As the radical polymerization initiator, one type may be used alone, or two or more types may be used in combination.

The amount of the radical polymerization initiator may be suitably changed depending upon the type, polymerization conditions, etc., and it is preferably from 0.005 to 5 mass %, particularly preferably from 0.05 to 0.5 mass %, based on the total amount of monomers to be used for the copolymerization.

The copolymerization type is not particularly limited, and bulk polymerization, suspension polymerization, emulsion polymerization or solution polymerization may, for example, be employed. Among them, solution polymerization is preferred wherein an aromatic compound such as xylene or toluene, an alcohol such as t-butyl alcohol, an ester, a fluorochlorocarbon or the like is used as the polymerization medium.

The amount of the polymerization medium is preferably from 10 to 200 mass %, particularly preferably from 50 to 100 mass %, based on the total amount of monomers to be used for the copolymerization.

Further, the copolymerization system may be any one of a batch system, a continuous system and a semicontinuous system.

With respect to the copolymerization temperature, the optimum value may suitably be selected depending upon the polymerization initiation source, the polymerization medium, etc., and it is preferably from $-30°$ C. to $150°$ C., more preferably from $0°$ C. to $100°$ C., most preferably from $20°$ C. to $70°$ C.

Likewise, the polymerization pressure may suitably be selected depending upon the polymerization initiation source, the polymerization medium, etc., and it is preferably from 0.1 to 10 MPa, particularly preferably from 0.2 to 2 MPa.

The copolymerization time is preferably from 4 to 24 hours, more preferably from 6 to 12 hours.

The molecular weight of the copolymer (B) may be adjusted by controlling the ratio of the monomers and the polymerization medium or by employing a chain transfer agent.

The number average molecular weight (Mn) of the copolymer (B) is preferably from 3,000 to 300,000, more preferably from 10,000 to 300,000. When Mn of the copolymer (B) is at least 3,000, the toughness of a coating film may easily be maintained. When Mn of the copolymer (B) is at most 300,000, formation of a film or sheet becomes easy.

Further, in a case where the application is in the coating field, Mn of the copolymer (B) is preferably from 3,000 to 30,000. In a case where it is used as a film or sheet, Mn of the copolymer (B) is more preferably from 10,000 to 100,000.

The molecular weight distribution (Mw/Mn) of the copolymer (B) is preferably from 1 to 3, more preferably from 1 to 2. When Mw/Mn of the copolymer (B) is at most 3, an improvement in the coating productivity or an improvement in the film strength can be expected.

Deprotection Step:

In the deprotection step, $R^1$ in polymerized units based on the vinyl ether (b) in the copolymer (B) obtained in the above polymerization step, is substituted with a hydrogen atom by a deprotection reaction to form a hydroxy group, whereby the polymerized units based on the vinyl ether (b) are converted to polymerized units based on vinyl alcohol, to obtain the copolymer (A) having polymerized units based on the fluoroolefin (a) and polymerized units based on vinyl alcohol. In a case where polymerized units based on the vinyl ether (c) are contained in the copolymer (B), $R^6$ in polymerized units based on the vinyl ether (c) is maintained as it is without undergoing a deprotection reaction, whereby the copolymer (A) having polymerized units based on the fluoroolefin (a), polymerized units based on vinyl alcohol and polymerized units based on the vinyl ether (c), will be obtained.

As a method for substituting $R^1$ in polymerized units based on the vinyl ether (b) in the copolymer (B) with a hydrogen atom by the deprotection reaction, a deprotection reaction of a protected alcohol by an acid, heat or light, which is commonly carried out, may be employed. Among them, it is preferred to substitute $R^1$ with a hydrogen atom by an acid, since it is thereby easy to prevent coloration of the obtainable copolymer (A).

The acid to be used for the deprotection reaction may, for example, be an inorganic acid such as sulfuric acid, hydrochloric acid or nitric acid, or an organic acid such as acetic acid, butyric acid or trifluoroacetic acid.

The deprotection reaction by an acid is preferably (1) a deprotection reaction in a mixed solution of sulfuric acid/ethanol/water, (2) a deprotection reaction in a mixed solution of hydrochloric acid/dioxane or (3) a deprotection reaction in a mixed solution of trifluoroacetic acid/methylene chloride. However, the deprotection reaction by an acid is not particularly limited to the reaction system of the above (1) to (3) and may be carried out in an aqueous system or in a non-aqueous system.

Further, the deprotection reaction by an acid may be carried out by using a photo-acid-generator which generates an acid under irradiation with light. Such a photo-acid-generator may, for example, be an onium salt, a halogenated compound, a diazoketone compound, a sulfone compound or a sulfonic acid compound. A specific example may, for example, be diphenyl iodonium triflate, triphenyl sulfonium triflate, phenyl-bis(trichlorimethyl)-s-triazine, methoxyphenyl-bis(trichloromethyl)-s-triazine, 4-trisphenancyl sulfone or 1,8-naphthalenedicarboxylic acid imide triflate.

In the deprotection step, depending upon a particular application of the copolymer (A), the deprotection reaction may be terminated halfway before all of protective groups in the copolymer (B) are deprotected, to obtain the copolymer (A) having polymerized units based on the fluoroolefin (a), polymerized units based on the vinyl ether (b) and polymerized units based on vinyl alcohol. By adjusting the ratio of polymerized units based on the vinyl ether (b) to polymerized units based on vinyl alcohol by terminating the deprotection reaction halfway, it is possible to adjust the hydrophilicity, crystallinity, etc. of the obtainable copolymer (A).

By the above-described process of the present invention, in the deprotection at the polymerized units based on vinyl ether (b) of the copolymer (B), coloration is prevented as is different from a conventional method for hydrolyzing a fluoroolefin/vinyl acetate copolymer obtained by copolymerizing a fluoroolefin and vinyl acetate. Further, even in the case of the deprotection by an acid, a sufficient reaction rate can be obtained. Therefore, it is possible to produce a high quality fluoroolefin/vinyl alcohol copolymer with sufficiently high productivity. In the present invention, a factor whereby the deprotection by an acid proceeds at a sufficient reaction rate, is considered to be such that the etheric oxygen atom of the vinyl ether (b) is likely to more readily undergo protonation than the acetic acid group of vinyl acetate.

Further, in the conventional copolymerization of a fluoroolefin and vinyl acetate, the fluoroolefin and vinyl acetate are randomly copolymerized, whereby the alternating copolymerizability of the two monomers is low. And, the positions of hydroxy groups in the fluoroolefin/vinyl alcohol copolymer obtainable from such a fluoroolefin/vinyl acetate copolymer, are also random. Therefore, in such a fluoroolefin/vinyl alcohol copolymer, the properties are non-uniform as between portions where the proportion of polymerized units based on the fluoroolefin is high and portions where the proportion of polymerized units based on vinyl alcohol is high, and accordingly, the water resistance and heat resistance tend to be low.

Whereas, according to the process of the present invention, the fluoroolefin (a) and the vinyl ether (b) or vinyl ether (c) are substantially alternately polymerized, whereby hydroxy groups will be uniformly distributed in the polymer chain. Therefore, hydroxy groups are not concentrated at specific sites, and it is possible to prevent that hydrophilicity of specific portions of the polymer chain becomes extremely high, and the copolymer (A) will exhibit excellent water resistance. Further, in the copolymer (A), polymerized units based on vinyl alcohol are not concentrated at specific sites, whereby excellent heat resistance can readily be obtainable.

The heat resistance of the copolymer (A) can be evaluated by the later-described 10 mass % thermal decomposition starting temperature (hereinafter referred to also as "$Td^{10}$[° C.]"). The 10 mass % thermal decomposition starting temperature of the copolymer (A) obtainable by the present invention is preferably at least 340° C., more preferably from 360 to 400° C.

For example, in a case where the copolymer (A) is used as a coating material, it is possible to form a coating film having hydroxy groups uniformly arranged. Further, from a composition comprising the copolymer (A) and a curing agent such as melamine or isocyanate reactive with hydroxy groups, it is possible to form a film or coating film made of a cured product having a crosslinked structure. In such a case, it is also possible to obtain such an effect that by uniformly distributing hydroxy groups without using the vinyl ether (c), the reactivity of hydroxy groups can be constantly obtained. Further, in a case where a curing agent is employed as mentioned above, timing for carrying out the deprotection step is not particularly limited, and for example, a composition obtained by mixing the copolymer (B), a component such as an acid to be used for the deprotection reaction and a curing agent, etc. is formed into a film or sheet and then light or heat is applied to form hydroxy groups to obtain a film or sheet made of a cured product having a crosslinked structure. That is, in such a case, the vinyl ether moieties in the copolymer (B) may be used as potential curing moieties.

EXAMPLES

Now, the present invention will be described in detail with reference to Examples and Comparative Examples. However, it should be understood that the present invention is by no means restricted by the following description.

[Measuring Methods]

(Number Average Molecular Weight (Mn), Molecular Weight Distribution (Mw/Mn))

The number average molecular weight (Mn) and the molecular weight distribution (Mw/Mn) of a copolymer obtained in each Example were measured by gel permeation chromatography (GPC) using a high speed GPC apparatus "HLC-8220GPC" manufactured by Tosoh Corporation. Their values are calculated values using polystyrene as standard substance. As the eluent, tetrahydrofuran was used.

(Glass Transition Temperature)

The glass transition temperature of a copolymer was measured by using "DSC Q-100" manufactured by TA Instruments Japan Inc., in a $N_2$ gas atmosphere at a temperature raising rate of 10° C./min.

(10 Mass % Thermal Decomposition Starting Temperature)

The 10 mass % thermal decomposition starting temperature of a copolymer was measured by using TGA Q-500 manufactured by TA Instruments Japan Inc., in air at a temperature raising rate of 10° C./min.

(Copolymer Composition)

The copolymer composition of a copolymer was calculated from the fluorine mass analytical values of the copolymer. However, in Example 6, the calculation was made by further combining the results of $^{13}C$-NMR measurement.

(Structure of Copolymer)

The structure of a copolymer was identified from the measurements of the IR spectrum, $^1H$-NMR and $^{13}C$-NMR spectra.

Example 1

Polymerization Step

Figure 2A:
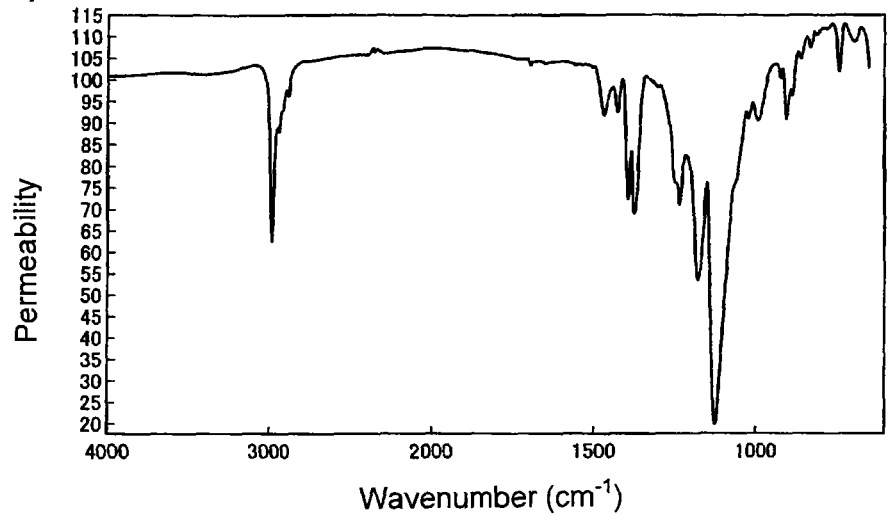
FIGS. 2(A) and (B) are IR charts of copolymer B1 and copolymer A1 in Example 1, respectively.

Into a stainless steel autoclave having an internal capacity of 200 mL and equipped with a stirrer (pressure resistance: 3 MPa), 79.0 g of t-butyl alcohol, 26.7 g of t-butyl vinyl ether (hereinafter referred to as "TBVE") as the vinyl ether (b), 0.48 g of potassium carbonate and 0.46 g of an isooctane solution containing 70% of perbutyl perpivarate (hereinafter referred to as "PBPV") were charged, and the oxygen in the system was removed by repeating pressure purging with $N_2$ gas. Then, 26.7 g of tetrafluoroethylene (hereinafter referred to as "TFE") as the fluoroolefin (a) was introduced into the autoclave, followed by heating to 55° C. The pressure at that time was 1.56 MPa. Then, polymerization was continued for 7 hours, and when the pressure decreased to 1.12 MPa, the autoclave was cooled with water, and non-reacted TFE was purged to terminate the polymerization. The obtained polymer solution was put into methanol to precipitate the formed copolymer B1, followed by vacuum drying. The yield of the copolymer B1 was 22.0 g, and the conversion of the monomers was 41%. The $^{13}C$-NMR spectrum of the copolymer B1 is shown in FIG. 1(A), and the IR spectrum is shown in FIG. 2(A).

As a result of the fluorine mass analysis, the copolymer compositional ratio of the copolymer B1 was TFE/TBVE=51/49 (mol %). Further, by a calculation from the copolymerization reactivity ratio of both monomers, it was found to have a substantially alternating structure (alternating copolymerization rate: at least 95%).

Figure 1B:
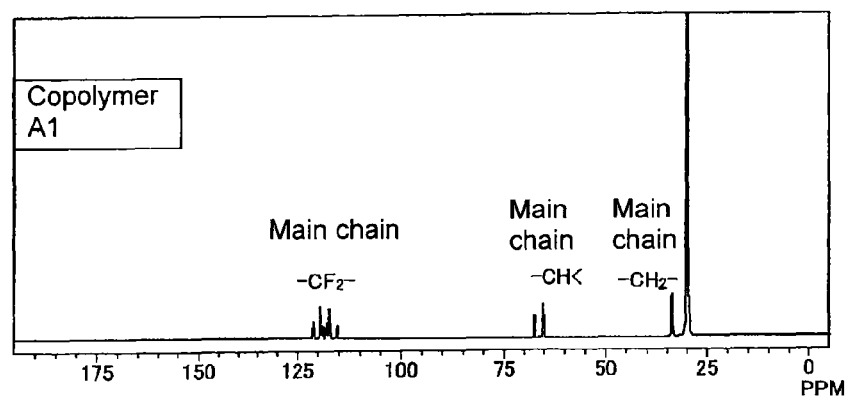
Figure 2B:
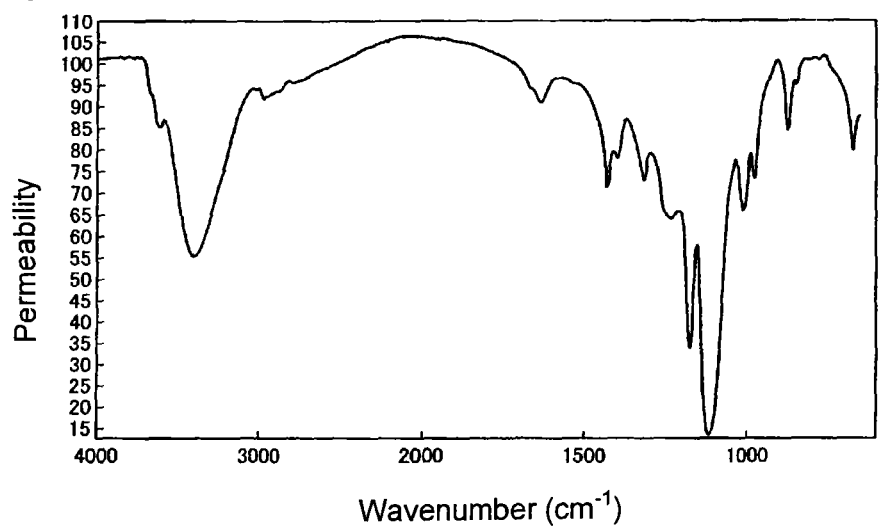

Deprotection Step:

2.0 g of the copolymer B1, 0.5 mL of concentrated sulfuric acid, 50 mL of ethanol and 1 mL of water were put into a 100 mL flask, heated and stirred at 90° C. to carry out a deprotection reaction. This reaction system became a uniform solution in from 3 to 4 hours. The reaction was continued for a total of 12 hours, and then, the reaction solution was dropped into water to precipitate a copolymer, which was washed with water and then vacuum-dried at 40° C. to isolate 1.42 g of white copolymer A1. The $^{13}C$-NMR spectrum of the copolymer A1 is shown in FIG. 1(B), and the IR spectrum is shown in FIG. 2(B).

By the measurements of the $^{13}C$-NMR spectrum and the IR spectrum, it was confirmed that in the copolymer A1, at least 97% of protective groups (t-butyl groups) were eliminated by hydrolysis to form hydroxy groups.

Example 2

The copolymer B1 obtained in Example 1 was used.

Deprotection Step:

2.0 g of the copolymer B1, 50 mL of 4N hydrochloric acid and 1 mL of 1,4-dioxane were put into a 100 mL flask, heated and stirred at 90° C. to carry out a deprotection reaction. This reaction system gradually became a uniform solution. The reaction was continued for a total of 12 hours, and then, the reaction solution was dropped into water to precipitate copolymer A2, which was washed with water and then vacuum-dried at 40° C. to isolate 1.49 g of the copolymer A2.

By the measurements of the $^1H$-NMR spectrum and the IR spectrum, it was confirmed that in the copolymer A2, at least 97% of protective groups (t-butyl groups) were eliminated.

Example 3

The copolymer B1 obtained in Example 1 was used.

Deprotection Step:

2.0 g of the copolymer B1, 50 mL of trifluoroacetic acid and 1 mL of methylene chloride were put into a 100 mL flask and then stirred at room temperature. The reaction was continued for a total of 48 hours, and then, the precipitated copolymer was washed with water and then vacuum-dried at 40° C. to isolate 1.33 g of the copolymer A3.

By the measurements of the $^1H$-NMR spectrum and the IR spectrum, it was confirmed that in the copolymer A3, at least 97% of protective groups (t-butyl groups) were detached.

Example 4

Polymerization Step

Into a stainless steel autoclave having an internal capacity of 30 mL and equipped with a stirrer (pressure resistance: 3 MPa), 8.97 g of t-butyl alcohol, 7.74 g of tetrahydropyranyl vinyl ether (hereinafter referred to as "THPVE") as the vinyl ether (b), 0.124 g of potassium carbonate and 0.298 g of an isooctane solution containing 70% of PBPV were charged, and the oxygen in the system was removed by repeating pressure purging with $N_2$ gas. Then, 6.1 g of TFE was introduced into the autoclave, followed by heating to 65° C. The pressure at that time was 1.75 MPa. Then, polymerization was continued for 5 hours, and when the pressure decreased to 0.59 MPa, the autoclave was cooled with water, and non-reacted TFE was purged to terminate the polymerization. The obtained polymer solution was put into methanol to precipitate the formed copolymer B2. The yield of the copolymer B2 was 9.04 g, and the conversion of the monomers was 65.3%.

As a result of the fluorine mass analysis, the copolymer compositional ratio of the copolymer B2 was TFE/TBVE=47/53 (mol %). By a calculation from the copolymerization reactivity ratio of both monomers, it was found to have a substantially alternating structure (alternating copolymerization rate: at least 95%).

Deprotection Step:

The deprotection step was carried out in the same manner as in Example 1 except that the copolymer B2 was used, to obtain copolymer A4.

By the measurements of the $^{13}$C-NMR spectrum and the IR spectrum, it was confirmed that in the copolymer A4, at least 95% of protective groups (tetrahydropyranyl groups) were eliminated.

Example 5

Polymerization Step

Into a stainless steel autoclave having an internal capacity of 200 mL and equipped with a stirrer (pressure resistance: 3 MPa), 79.0 g of t-butyl alcohol, 26.7 g of TBVE, 0.52 g of potassium carbonate and 0.47 g of an isooctane solution containing 70% of PBPV were charged, and the oxygen in the system was removed by repeating pressure purging with $N_2$ gas. Then, 31.1 g of chlorotrifluoroethylene (hereinafter referred to as "CTFE") as the fluoroolefin (a) was introduced into the autoclave, followed by heating to 55° C., and polymerization was continued for 7 hours. Then, the autoclave was cooled with water, and non-reacted CTFE was purged to terminate the polymerization. The obtained polymer solution was put into methanol to precipitate the formed copolymer B3. The yield of the copolymer B3 was 10.22 g, and the conversion of the monomers was 17.7%.

As a result of the fluorine mass analysis, the copolymer compositional ratio of the copolymer B3 was CTFE/TBVE=49/51 (mol %).

Deprotection Step:

The deprotection step was carried out in the same manner as in Example 1 except that the copolymer B3 was used, to obtain copolymer A5.

By the measurements of the $^{13}$C-NMR spectrum and the IR spectrum, it was confirmed that in the copolymer A5, at least 95% of protective groups (t-butyl groups) were eliminated. The glass transition temperature of the copolymer A5 was not clear.

Example 6

Polymerization Step

Into a stainless steel autoclave having an internal capacity of 200 mL and equipped with a stirrer (pressure resistance: 3 MPa), 79.0 g of t-butyl alcohol, 13.4 g of TBVE, 16.8 g of cyclohexyl vinyl ether (hereinafter referred to as "CHVE") as the vinyl ether (c), 0.52 g of potassium carbonate and 0.51 g of an isooctane solution containing 70% of PBPV were charged, and the oxygen in the system was removed by repeating pressure purging with $N_2$ gas. Then, 26.7 g of CTFE was introduced into the autoclave, followed by heating to 55° C., and polymerization was continued for 7 hours. Then, the autoclave was cooled with water, and non-reacted CTFE was purged to terminate the polymerization. The obtained polymer solution was put into methanol to precipitate the formed copolymer B4, followed by vacuum drying. The yield of the copolymer B4 was 30.1 g, and the conversion of the monomers was 53%.

As a result of the fluorine mass analysis and the $^{13}$C-NMR measurement, the copolymer compositional ratio of the copolymer B4 was CTFE/TBVE/CHVE=51/24/25 (mol %). Further, by a calculation from the copolymerization reactivity ratio of the monomers, it was found to have a substantially alternating structure (alternating copolymerization rate: at least 95%).

Deprotection Step:

The deprotection step was carried out in the same manner as in Example 1 except that the copolymer B4 was used, to obtain copolymer A6.

By the measurements of the $^1$H-NMR spectrum and the IR spectrum, it was confirmed that in the copolymer A6, at least 95% of protective groups (t-butyl groups) were eliminated. Further, from the fluorine mass analysis, the polymerized units based on CHVE were confirmed to have remained as they were.

Comparative Example 1

Polymerization Step

Into a stainless steel autoclave having an internal capacity of 200 mL and equipped with a stirrer (pressure resistance: 3 MPa), 61.9 g of methyl acetate, 9.1 g of vinyl acetate (hereinafter referred to as "VAc") and 0.39 g of an isooctane solution containing 70% of PBPV were charged, and the oxygen in the system was removed by repeating pressure purging with $N_2$ gas. Then, 20.9 g of TFE was introduced into the autoclave, followed by heating to 55° C. The pressure at that time was 1.23 MPa. Then, polymerization was continued for one hour, and when the pressure decreased to 0.75 MPa, the autoclave was cooled with water, and non-reacted TFE was purged to terminate the polymerization. The obtained polymer solution was put into methanol to precipitate copolymer C1, followed by vacuum drying. The yield of the copolymer C1 was 18.5 g, and the conversion of the monomers was 62%.

As a result of the fluorine mass analysis, the copolymer compositional ratio of the copolymer C1 was TFE/VAc=49/51 (mol %). The alternating copolymerization rate of the copolymer C1 was from 80 to 85% by a calculation from the copolymerization reactivity ratio of both monomers.

Deprotection Step:

2.0 g of the copolymer C1, 0.5 mL of concentrated sulfuric acid, 50 mL of ethanol and 1 mL of water were put into a 100 mL flask, and while heating and stirring at 90° C., a reaction was carried out for 24 hours. After the reaction, the deprotection rate was calculated from the fluorine mass analytical value and found to be about 50%. When the heating was further continued, the reaction system gradually became a uniform solution. The reaction was continued for a total of 72 hours, and then, the reaction solution was dropped into water to precipitate copolymer D1, which was washed with water and then vacuum-dried at 40° C. to isolate 1.42 g of the copolymer D1.

By the measurements of the $^{13}$C-NMR spectrum and the IR spectrum, it was confirmed that in the copolymer D1, at least 97% of protective groups (acetyl groups) were eliminated to form hydroxy groups.

Comparative Example 2

The copolymer C1 obtained in Comparative Example 1 was used.

Deprotection Step:

2.0 g of the copolymer C1, 50 mL of ethanol and 3.5 mL of a 30 mass % sodium hydroxide aqueous solution were put into a 100 mL flask, and while heating and stirring at 90° C., a reaction was carried out for 24 hours, whereby the reaction system became reddish brown. The reaction solution was dropped into water to precipitate copolymer D2, which was washed water and then vacuum-dried at 40° C. to isolate 1.46 g of the copolymer D2. The copolymer D2 was colored yellow.

Comparative Example 3

Polymerization Step

Into a stainless steel autoclave having an internal capacity of 200 mL and equipped with a stirrer (pressure resistance: 3 MPa), 79.0 g of t-butyl alcohol, 33.6 g of CHVE, 0.54 g of potassium carbonate and 0.46 g of an isooctane solution containing 70% of PBPV were charged, and the oxygen in the system was removed by repeating pressure purging with $N_2$ gas. Then, 26.7 g of TFE was introduced into the autoclave, followed by heating to 55° C. The pressure at that time was 1.54 MPa. Then, polymerization was continued for 6 hours, and when the pressure decreased to 0.75 MPa, the autoclave was cooled with water, and non-reacted TFE was purged to terminate the polymerization. The obtained polymer solution was put into methanol to precipitate copolymer C2, followed by vacuum drying. The yield of the copolymer C2 was 42.2 g, and the conversion of the monomers was 70%.

As a result of the fluorine mass analysis, the copolymer compositional ratio of the obtained copolymer C2 was TFE/CHVE=50/50 (mol %).

Deprotection Step:

The deprotection reaction was attempted under the same conditions as in Example 1 by using the copolymer C2. After heating and stirring for 48 hours, copolymer D3 was recovered and vacuum dried. The copolymer D3 was analyzed by the IR spectrum, whereby it was found that there was no change in the spectrum as between before and after the reaction, and the deprotection reaction did not proceed. That is, the copolymer D3 was the same copolymer as the copolymer C2.

With respect to the copolymers obtained in Examples and Comparative Examples, the results of measurements of the number average molecular weight (Mn), the molecular weight distribution (Mw/Mn), the glass transition temperature (Tg), the 10 mass % thermal decomposition starting temperature ($Td_{10}$) and the melting point (Tm), and presence or absence of coloration after the deprotection step, are shown in Table 1.

TABLE 1

|  |  | Polymerization step | | | | Deprotection step | | | | | |
| --- | --- | --- | --- | --- | --- | --- | --- | --- | --- | --- | --- |
|  | Monomers | Mn | Mw/Mn | Tg [° C.] | Td10 [° C.] | Mn | Mw/Mn | Tg [° C.] | Td10 [° C.] | Tm [° C.] | Coloration |
| Ex. 1 | TFE/TBVE | 21600 | 1.67 | 34 | 341 | 19100 | 1.77 | 75-80 | 366 | 207 | Nil |
| Ex. 2 | TFE/TBVE | 21600 | 1.67 | 34 | 341 | 20900 | 1.74 | 75-80 | 376 | 206 | Nil |
| Ex. 3 | TFE/TBVE | 21600 | 1.67 | 34 | 341 | 19500 | 1.91 | 75-80 | 365 | 206 | Nil |
| Ex. 4 | TFE/THPVE | 37600 | 2.88 | 39 | 389 | 28200 | 2.95 | 75-80 | 389 | 207 | Nil |
| Ex. 5 | CTFE/TBVE | 13500 | 2.02 | 63 | 263 | 11600 | 2.23 | Not known | 310 | 168 | Nil |
| Ex. 6 | CTFE/TBVE/CHVE | 18800 | 2.15 | 38 | 351 | 17700 | 2.29 | 35 | 340 | Nil | Nil |
| Comp. Ex. 1 | TFE/VAc | 38000 | 2.79 | 40 | 341 | 32100 | 2.90 | 65-70 | 322 | 212 | Nil |
| Comp. Ex. 2 | TFE/VAc | 38000 | 2.79 | 40 | 341 | 30500 | 2.95 | 320 | 320 | 212 | Observed |
| Comp. Ex. 3 | TFE/CHVE | 16800 | 1.98 | 43 | 360 | The reaction did not proceed. | | | | | |

As shown in Table 1, the copolymers (A1 to A4) in Examples 1 to 4 produced by using the vinyl ether (b) had no coloration and had a high quality. Further, the copolymers (A1 to A6) obtained in Examples 1 to 6 had high 10 mass % thermal decomposition starting temperatures and were excellent in heat resistance.

Whereas, the copolymers (D1 and D2) in Comparative Example 1 and 2 produced by using vinyl acetate, had lower 10 mass % thermal decomposition starting temperatures as compared with the copolymers (A1 to A4) in Examples 1 to 4 and were inferior in heat resistance. This is considered to be such that since polymerized units based on vinyl acetate were consecutively arrayed, portions where polymerized units based on vinyl alcohol were consecutively arrayed, were formed, and such portions were likely to be broken by heat.

Further, the deprotection step by an acid in Comparative Example 1 required 72 hours and thus was inferior in the productivity as compared with 12 hours as required in the deprotection step by an acid under the same conditions in Example 1.

Further, the copolymer D2 in Comparative Example 2 produced by hydrolyzing the copolymer C1 produced by using vinyl acetate, under a basic condition, was inferior in quality with coloration to yellow observed.

Further, in Comparative Example 3 (Copolymer C2) wherein only the vinyl ether (c) was used without using the vinyl ether (b) in the deprotection step, the deprotection reaction did not proceed, and the desired copolymer (A) was not obtained.

INDUSTRIAL APPLICABILITY

The copolymer (A) obtainable by the process of the present invention is useful as e.g. a raw material for coating material excellent in weather resistance and transparency, an optical material excellent in transparency, a gas/liquid separation film material excellent in water resistance, a gas barrier material, a sealing material for solar cells, a material for various surface protective sheets, a hydrophilic porous material, etc.

This application is a continuation of PCT Application No. PCT/JP2011/058736, filed Apr. 6, 2011, which is based upon and claims the benefit of priority from Japanese Patent Application No. 2010-089504 filed on Apr. 8, 2010. The contents of those applications are incorporated herein by reference in its entirety.

What is claimed is:

1. A process for producing a fluoroolefin/vinyl alcohol copolymer, which comprises a polymerization step of copolymerizing a fluoroolefin represented by the following formula (1) and a vinyl ether represented by the following formula (2), and a deprotection step of substituting $R^1$ in polymerized units based on the vinyl ether in the copolymer obtained in the polymerization step, with a hydrogen atom to form a hydroxy group:

$$CF_2=CFX \tag{1}$$

$$CH_2=CHOR^1 \tag{2}$$

wherein X is a fluorine atom, a chlorine atom, a trifluoromethyl group or $-OC_aF_{2a+1}$ wherein a is an integer of from 1 to 3, and $R^1$ is a protective group to be substituted with a hydrogen atom by a deprotection reaction wherein $R^1$ in the formula (2) is $-CR^2R^3R^4$ wherein each of $R^2$, $R^3$ and $R^4$ which are independent of one another, is a $C_{1-3}$ alkyl group, a $C_{1-6}$ alkoxymethyl group, a tetrahydrofuryl group, a tetrahydropyranyl group or a trialkylsilyl group $-Si(R^5)_3$ wherein $R^5$ is a $C_{1-6}$ alkyl group or an aryl group.

2. The process for producing a fluoroolefin/vinyl alcohol copolymer according to claim 1, wherein the vinyl ether represented by the formula (2) is t-butyl vinyl ether.

3. The process for producing a fluoroolefin/vinyl alcohol copolymer according to claim 1, wherein $R^1$ is substituted with a hydrogen atom by an acid.

4. The process for producing a fluoroolefin/vinyl alcohol copolymer according to claim 1, wherein in the polymerization step, the molar ratio of the fluoroolefin represented by the formula (1) to the vinyl ether represented by the formula (2) (fluoroolefin)/(vinyl ether) is from 45/55 to 55/45.

5. The process for producing a fluoroolefin/vinyl alcohol copolymer according to claim 1, wherein a vinyl ether represented by the following formula (3) is further copolymerized:

$$CH_2=CHOR^6 \tag{3}$$

wherein $R^6$ is a group which is not susceptible to a deprotection reaction in the deprotection step.

* * * * *